US012036789B2

(12) United States Patent
Hamada

(10) Patent No.: US 12,036,789 B2
(45) Date of Patent: Jul. 16, 2024

(54) IMAGE FORMING APPARATUS WITH SWITCHING DEVICE THAT SWITCHES ON AND OFF DEPENDING ON DIFFERENCE IN RIGIDITY OF SHEET

(71) Applicant: KYOCERA Document Solutions Inc., Osaka (JP)

(72) Inventor: Takuya Hamada, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 100 days.

(21) Appl. No.: 17/894,201

(22) Filed: Aug. 24, 2022

(65) Prior Publication Data

US 2023/0060656 A1 Mar. 2, 2023

(30) Foreign Application Priority Data

Aug. 30, 2021 (JP) ................................ 2021-140252

(51) Int. Cl.
*B41J 11/42* (2006.01)
*B41J 13/00* (2006.01)
*G03G 15/00* (2006.01)

(52) U.S. Cl.
CPC ........... *B41J 11/42* (2013.01); *B41J 13/0018* (2013.01); *G03G 15/6552* (2013.01); *B41J 13/009* (2013.01)

(58) Field of Classification Search
CPC ...... B41J 11/42; B41J 13/0018; B41J 13/009; G03G 15/6552
See application file for complete search history.

(56) References Cited

U.S. PATENT DOCUMENTS

| | | | | |
|---|---|---|---|---|
| 6,198,058 B1 * | 3/2001 | Graninger ............ | H01H 13/503 200/16 R |
| 2007/0018383 A1 * | 1/2007 | Ohara ...................... | B65H 7/12 271/262 |
| 2007/0137995 A1 * | 6/2007 | Scherl ................. | H01H 13/506 200/405 |
| 2007/0234582 A1 * | 10/2007 | Kondo .............. | G01B 11/0691 33/501.04 |

FOREIGN PATENT DOCUMENTS

| | | |
|---|---|---|
| JP | 2005181692 A | 7/2005 |

* cited by examiner

*Primary Examiner* — Henok D Legesse
(74) *Attorney, Agent, or Firm* — IP Business Solutions, LLC

(57) ABSTRACT

An image forming apparatus includes a sheet storage section, an image forming device, a transport route, a transport device, and a switching device. The switching device is turned on or off depending on a pressing force applied by an end portion of a sheet being transported along the transport route, at a position on the transport route upstream of the image forming device in a sheet transport direction. The switching device is turned on or off depending on whether the pressing force is equal to or larger than a predetermined pressing force to be applied by the sheet having predetermined rigidity, or smaller than the predetermined pressing force.

5 Claims, 11 Drawing Sheets

IMAGE FORMING APPARATUS WITH SWITCHING DEVICE THAT SWITCHES ON AND OFF DEPENDING ON DIFFERENCE IN RIGIDITY OF SHEET

INCORPORATION BY REFERENCE

This application claims priority to Japanese Patent Application No. 2021-140252 filed on Aug. 30, 2021, the entire contents of which are incorporated by reference herein.

BACKGROUND

The present disclosure relates to an image forming apparatus that controls transport of sheets, depending on the rigidity thereof.

In the image forming apparatus, in general, the sheets stored in a sheet storage section are transported to an image forming device along a transport route, so that the image forming device forms an image on the sheet, and the sheet with the image formed thereon is delivered to an output section. With the increase in variation of the sheet types, nowadays the user utilizes the sheets of different rigidity levels. When a thick paper having high rigidity is employed for the image forming, it is difficult for the sheet to follow up a curved portion on the transport route, and therefore the sheet may cause clogging, or become wrinkled. As a solution to such a drawback, an image forming apparatus having a mechanism to detect the rigidity of the sheet has been proposed.

SUMMARY

The disclosure proposes further improvement of the foregoing techniques.

In an aspect, the disclosure provides an image forming apparatus including a sheet storage section, an image forming device, a transport route, a transport device, and a switching device. The sheet storage section is for storing sheets therein. The image forming device forms an image on the sheet. The transport route is provided between the sheet storage section and the image forming device. The transport device picks up the sheets stored in the sheet storage section one by one, and transports the sheet to the image forming device, along the transport route. The switching device is turned on or off depending on a pressing force applied by an end portion of the sheet being transported along the transport route, at a position on the transport route upstream of the image forming device in a sheet transport direction. The switching device is turned on or off depending on whether the pressing force is equal to or larger than a predetermined pressing force to be applied by the sheet having predetermined rigidity, or smaller than the predetermined pressing force.

DETAILED DESCRIPTION

Figure 1:
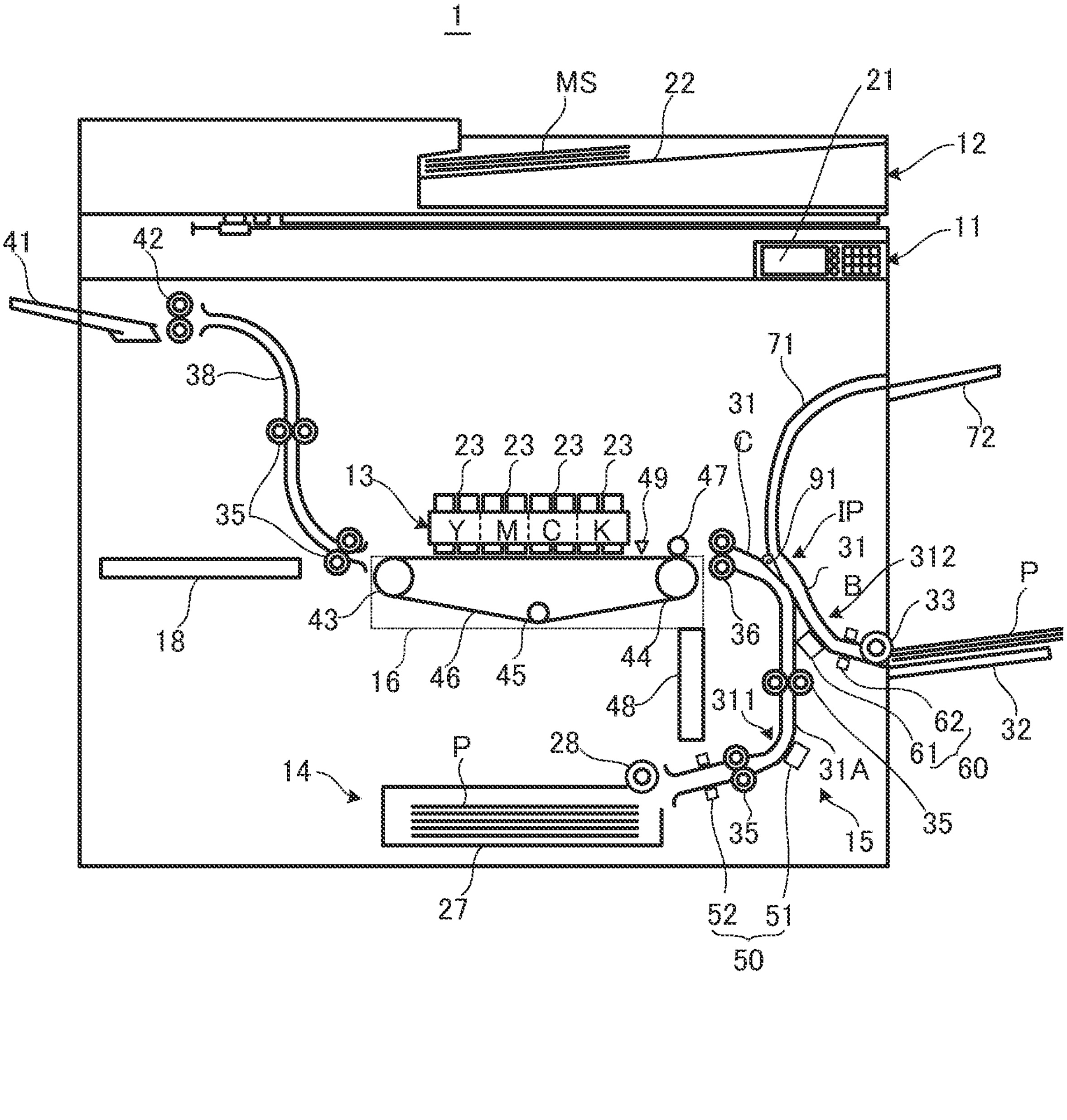
FIG. 1 is a cross-sectional view showing an ink jet recording apparatus.
Figure 2:
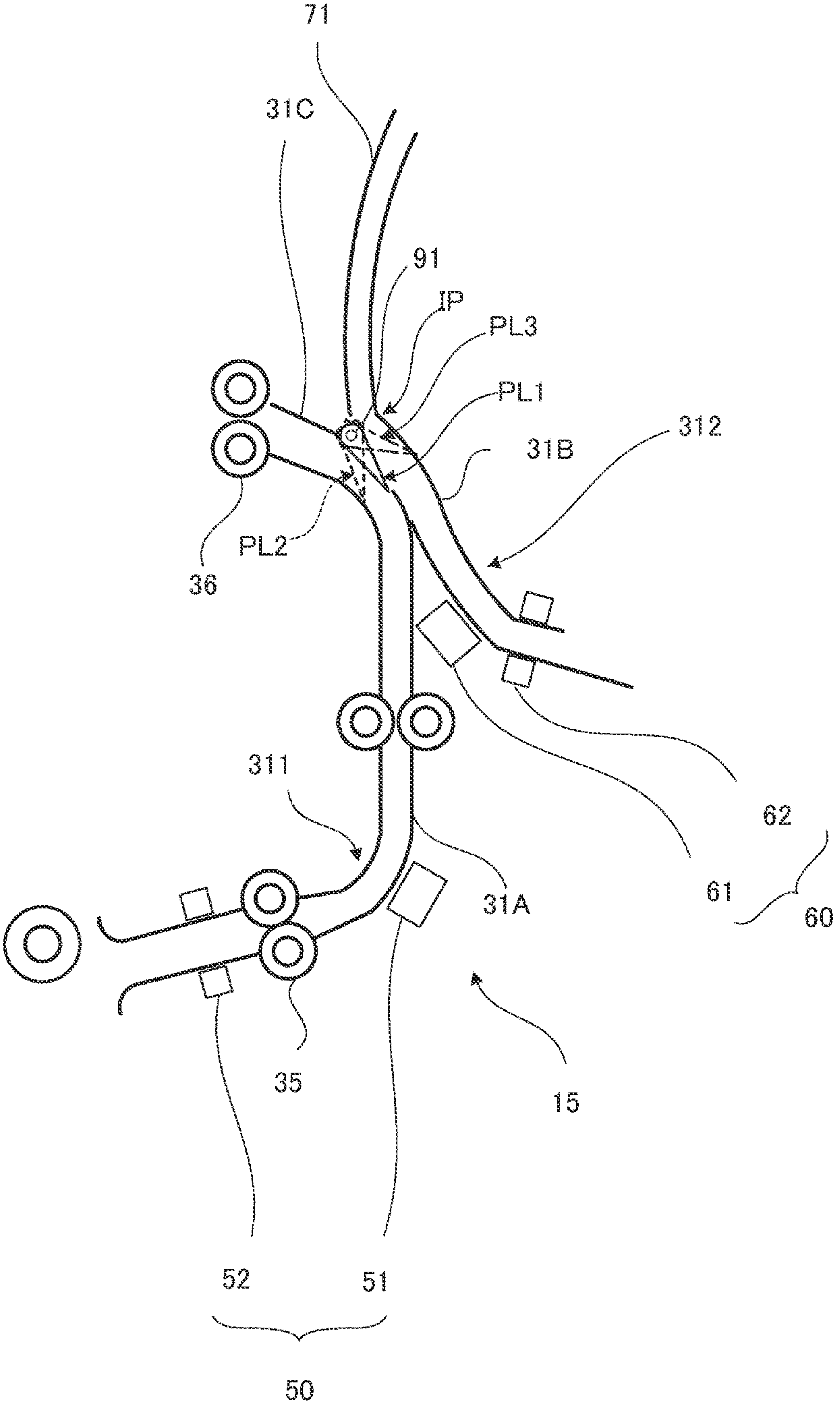
FIG. 2 is a schematic cross-sectional view showing a merging point of two transport routes.

Hereafter, an image forming apparatus according to an embodiment of the disclosure will be described, with reference to the drawings. FIG. 1 is a cross-sectional view showing an ink jet recording apparatus 1, exemplifying the image forming apparatus according to the embodiment of the disclosure. FIG. 2 is a schematic cross-sectional view showing a merging point of a transport route 31A and a transport route 31B. The ink jet recording apparatus 1 includes an operation device 11, a document reading device 12, an image forming device 13, a paper feeding device 14, a transport device 15, a belt unit 16, a cap 18, an elevation mechanism 48, a first rigidity detection device 50, and a second rigidity detection device 60.

The operation device 11 is operated by a user, to input instructions related to the functions and processings that the ink jet recording apparatus 1 is configured to perform. For example, the operation device 11 includes physical keys such as a tenkey, an enter key, and a start key. The operation device 11 also includes a display device 21, which can act as the alerter in the disclosure.

The display device 21 includes, for example, a liquid crystal display (LCD). The display device 21 includes a touch panel. When the user touches a button or a key displayed on the screen, the touch panel receives the instruction corresponding to the touched position.

The document reading device 12 picks up a source document MS placed on a document tray 22, and reads the image of the source document MS with an image sensor, while transporting the source document MS from the document tray 22. The document reading device 12 then converts the analog output from the image sensor to a digital signal, thereby generating image data representing the image of the source document MS.

The image forming device 13 prints the image of the source document MS represented by the image data, on a sheet P The image forming device 13 ejects ink droplets of four colors (black, cyan, magenta, and yellow) onto the sheet P transported by a transport belt 46 of the belt unit 16, thereby forming a color image on the sheet P To be more detailed, the image forming device 13 includes line heads 23 respectively corresponding to the black, cyan, magenta, and yellow inks. In other words, the ink jet recording apparatus 1 is configured as a line head-type ink jet recording apparatus.

The transport device 15 transports the sheet P delivered from the paper feeding device 14, to the transport belt 46 of the belt unit 16 through a transport route 31A and a transport route 31C. The transport device 15 further transports the sheet P transported by the transport belt 46 through a transport route 38, and delivers the sheet P to an output tray 41. Here, the paper feeding device 14 and the transport device 15 exemplify the transport device in the disclosure.

The paper feeding device 14 includes a paper cassette 27, an example of the sheet storage section in the disclosure. A paper feeding roller 28 is provided on the paper cassette 27.

The paper feeding roller 28 serves to pick up the sheet P stored in the paper cassette 27, and delivers the sheet P to the transport route 31A.

The paper feeding device 14 also includes a manual bypass tray 32 provided on a side wall of the apparatus main body. The sheet P placed on the manual bypass tray 32 is picked up by a paper feeding roller 33, and delivered to the transport route 31C through a transport route 31B.

The transport device 15 includes, for the purpose of transporting the sheet P delivered from the paper feeding device 14, the transport route 31A, the transport route 31B, a bypass transport route 71, and transport rollers 35 located at predetermined positions on the transport route 38. The transport device 15 also includes a resist roller 36 that corrects a skew of the sheet P when delivering the sheet P to the transport belt 46 of the belt unit 16, and a delivery roller 42 that delivers the sheet P transported through the transport route 38 to the output tray 41.

The belt unit 16 includes a drive roller 43, a follower roller 44, a tension roller 45, the transport belt 46, and an adsorption roller 47. The transport belt 46 is an endless belt engaged around the drive roller 43, the follower roller 44, and the tension roller 45. The drive roller 43 is driven by a motor so as to rotate counterclockwise. When the drive roller 43 is made to rotate, the transport belt 46 is made to revolve counterclockwise, and also the follower roller 44 and the tension roller 45 are made to follow up the counterclockwise rotation.

The transport belt 46 transports the sheet P delivered by the transport device 15 through the transport route 31C, by carrying the sheet P on the transport belt 46.

The tension roller 45 serves to maintain the tension of the transport belt 46 at an appropriate level.

The adsorption roller 47 is located in contact with the transport belt 46. The adsorption roller 47 electrically charges the transport belt 46, thereby causing the sheet P transported by the transport device 15 to electrostatically adsorb to the transport belt 46. Here, instead of the electrostatic adsorption by the adsorption roller 47, a plurality of ventilation holes may be formed in the transport belt 46, and a fan may be provided on the back of the transport belt 46. In this case, air is sucked by the fan through the ventilation holes of the transport belt 46, so that the sheet P is adsorbed to the transport belt 46 owing to a negative pressure.

The first rigidity detection device 50 is provided at a first curved portion 311 in a view from the paper cassette 27, on the transport route 31A extending therefrom toward the belt unit 16 of the image forming device 13. The second rigidity detection device 60 is provided at a first curved portion 312 in a view from the manual bypass tray 32, on the transport route 31B extending therefrom toward the belt unit 16 of the image forming device 13. In addition, an optical sensor 49 for detecting the presence of the sheet P on the transport belt 46 is provided at a position opposed to the transport belt 46.

In the vicinity of a merging point of the transport route 31A and the transport route 31B, a bypass transport route 71, branched from the transport route 31C extending toward the image forming device 13, is provided. The bypass transport route 71 serves to guide the sheet P from the transport route 31A or 31B to a discharge tray 72. In other words, both the sheet P transported along the transport route 31A, and the sheet P transported along the transport route 31B, can intrude into the bypass transport route 71. Therefore, a branching device 91 is provided at an intersection IP, corresponding to the merging and branching point, to deliver the sheet P transported along the transport route 31A and the sheet P transported along the transport route 31B, to either of the transport route 31C and the bypass transport route 71. The action of the branching device 91 is controlled by a controller 100 (see FIG. 7) to be subsequently described.

The elevation mechanism 48 serves to sustain the belt unit 16 from below, and to move the belt unit 16 up and downward with respect to the line heads 23 of the image forming device 13. In other words, the elevation mechanism 48 moves the belt unit 16 relative to the line heads 23, so as to move the belt unit 16 toward and away from the line heads 23. To be more detailed, the elevation mechanism 48 moves the belt unit 16 between a recording position where the image forming device 13 can execute the printing operation (position shown in FIG. 1), and a maintenance position spaced downward in FIG. 1 from the recording position by a predetermined distance.

When the elevation mechanism 48 moves down the belt unit 16 to the maintenance position, a vacant space is defined under the image forming device 13. Then moving mechanism horizontally moves the cap 18 to the position right under the image forming device 13, and then moves the cap 18 upward. Accordingly, the cap 18 is overlaid on the nozzles of the line heads 23 of the image forming device 13 so as to cover the same, so that the ink in the nozzles of the line heads 23 of the image forming device 13 can be prevented from drying.

Figure 3:
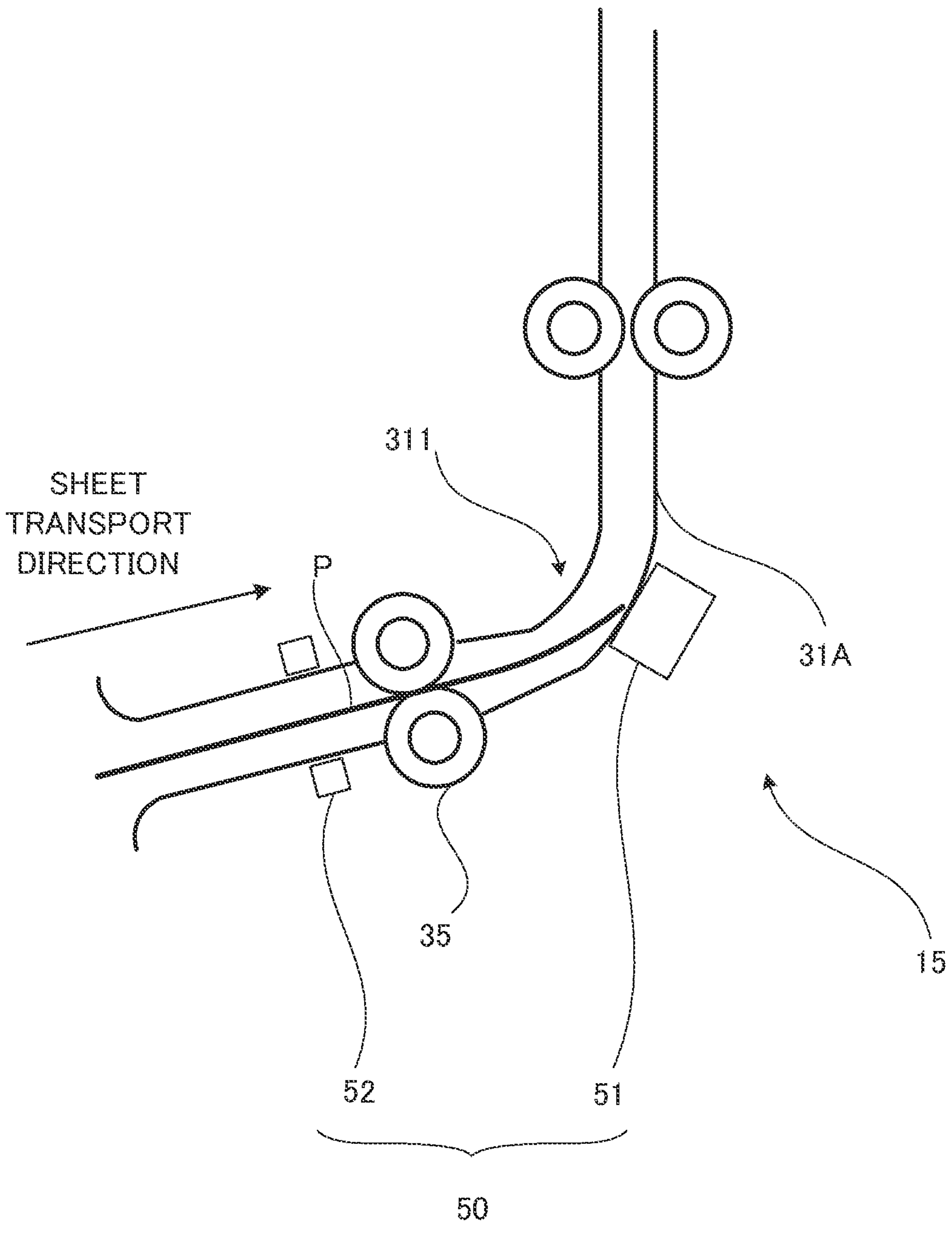
FIG. 3 is a schematic cross-sectional view showing a portion in the transport route where a first rigidity detection device is provided.

The first rigidity detection device 50 will now be described hereunder. FIG. 3 illustrates the portion on the transport route 31A where the first rigidity detection device 50 is located. The first rigidity detection device 50 is located at the first curved portion 311 in a view from the paper cassette 27, on the transport route 31A. The first rigidity detection device 50 includes a switching device 51 and a timing sensor 52. The switching device 51 is located at a predetermined position on the transport route 31A upstream of the image forming device 13 in the sheet transport direction, on the transport route provided between the paper feeding device 14 and the image forming device 13. The switching device 51 is turned on or off, depending on the pressure of the leading edge of the sheet P transported along the transport route 31A. The switching device 51 is located at the position on the curved portion 311 where the leading edge of the sheet P transported by the transport roller 35 is made to abut. As will be subsequently described in further detail, the switching device 51 is kept on, while no pressure is applied thereto.

When the sheet P abuts against the curved portion 311, the sheet P starts to be bent according to the shape of the curved portion 311, because of the resistance therefrom. Accordingly, the pressure applied to the switching device 51 by the abutting action of the sheet P becomes greater, the higher the rigidity of the sheet P is.

Therefore, the controller 100 of the ink jet recording apparatus 1, to be subsequently described, specifies in advance a range of the rigidity of the sheet P that allows the sheet P to be smoothly transported, and allows proper image forming on the sheet P With respect to the ink jet recording apparatus 1, experiments were carried out in advance, to measure a pressing force V1 applied to the switching device 51, when the leading edge of the sheet P, having a minimum rigidity that disables the transport and the image forming (predetermined high rigidity), abuts against the switching device 51. The switching device 51 is set to be turned off, only when a pressure equal to or greater than the pressing force V1, determined through the experiment, is applied to the switching device 51 by the leading edge of the sheet P Here, it suffices that the switching device 51 is set to be turned off or on, when a pressure equal to or greater than the pressing force V1 is applied by the leading edge of the sheet P, and to be maintained on or off reversely to the state where a pressure equal to or greater than the pressing force V1 is applied, when such pressure is not applied. In this embodiment, the switching device 51 is configured to be turned off when a pressure equal to or greater than the pressing force V1 is applied by the leading edge of the sheet P, and to stay on while such pressure is not applied.

The timing sensor 52 is provided on the transport route 31A at a position upstream of the switching device 51, in the sheet transport direction. The timing sensor 52 detects the leading edge of the sheet P being transported along the transport route 31A, and outputs a sheet presence signal to the controller 100, as a detection signal. The controller 100 decides whether the off-signal, indicating the off state, from the switching device 51, when a predetermined period of time has elapsed after the sheet presence signal was received.

Figure 4:
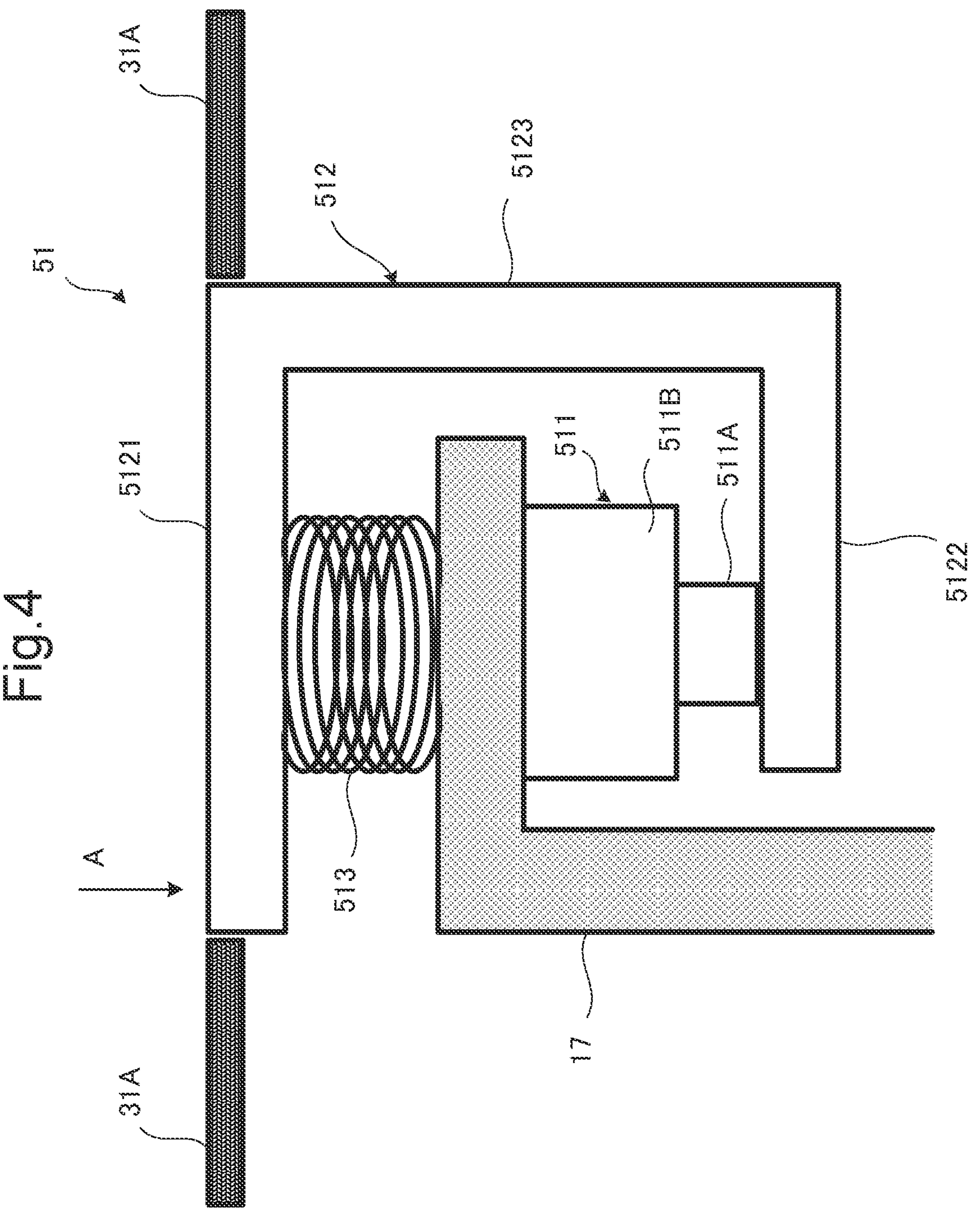
FIG. 4 and FIG. 5 are internal side views each showing an exemplary structure of a switching device.

Hereunder, a structure of the switching device 51 will be described. FIG. 4 is an internal side view showing an exemplary structure of the switching device 51. The switching device 51 includes a switch main body 511, a contact portion 512, and a pressure spring 513.

The switch main body 511 is fixedly mounted on an apparatus main body 17 of the ink jet recording apparatus 1. The switch main body 511 includes a movable portion 511A set to move for the switching action, provided on the apparatus main body 17 so as to protrude to the opposite side of the transport route 31A. The switch main body 511 outputs the on-signal to the controller 100, when a switching mechanism located inside a pedestal 511B is connected to be turned on, because of the movable portion 511A being pressed into the pedestal 511B by a pressure applied by the contact portion 512. While the switching mechanism is disconnected and turned off, because of the movable portion 511A being free from the pressure of the contact portion 512 and not pressed into the pedestal 511B, the switch main body 511 outputs the off-signal to the controller 100.

The contact portion 512 is formed of a member separate from the switch main body 511. The contact portion 512 is located so as to make contact with the movable portion 511A of the switch main body 511. The contact portion 512 is mounted on the back of the apparatus main body 17 to which the switch main body 511 is fixed, via the pressure spring 513 (exemplifying the elastic member in the disclosure). The contact portion 512 is, as shown in FIG. 4, formed in a C-shape in a side view. The contact portion 512 includes an abutment portion 5121 located so as to be exposed in the transport route 31A, a pressing portion 5122 that makes contact with the movable portion 511A of the switch main body 511 to press the movable portion 511A, and a support portion 5123 connecting between the abutment portion 5121 and the pressing portion 5122 to support these portions. An end portion of the pressure spring 513 is attached to the surface of the abutment portion 5121 on the side of the switch main body 511. The contact portion 512 is fixed to the apparatus main body 17, so as to move along the stretching and shrinking direction of the pressure spring 513. The pressing portion 5122 is formed so as to oppose the abutment portion 5121, across the switch main body 511 fixed to the apparatus main body 17, in the stretching and shrinking direction of the pressure spring 513. Accordingly, the contact portion 512 can move along the stretching and shrinking direction of the pressure spring 513, because of the elasticity thereof.

The abutment portion 5121, constituting a part of the contact portion 512, is exposed in the transport route 31A, at a predetermined position upstream of the image forming device 13 in the sheet transport direction.

The abutment portion 5121 is constantly biased toward the transport route 31A, by the pressing force of the pressure spring 513, having the other end portion attached to the apparatus main body 17. Therefore, while the abutment portion 5121 is not subjected to a pressure in a direction of an arrow A in FIG. 4, the pressing portion 5122 of the contact portion 512 presses the movable portion 511A of the switch main body 511 toward the transport route 31A, so that the switch main body 511 is maintained in the on state.

Figure 5:
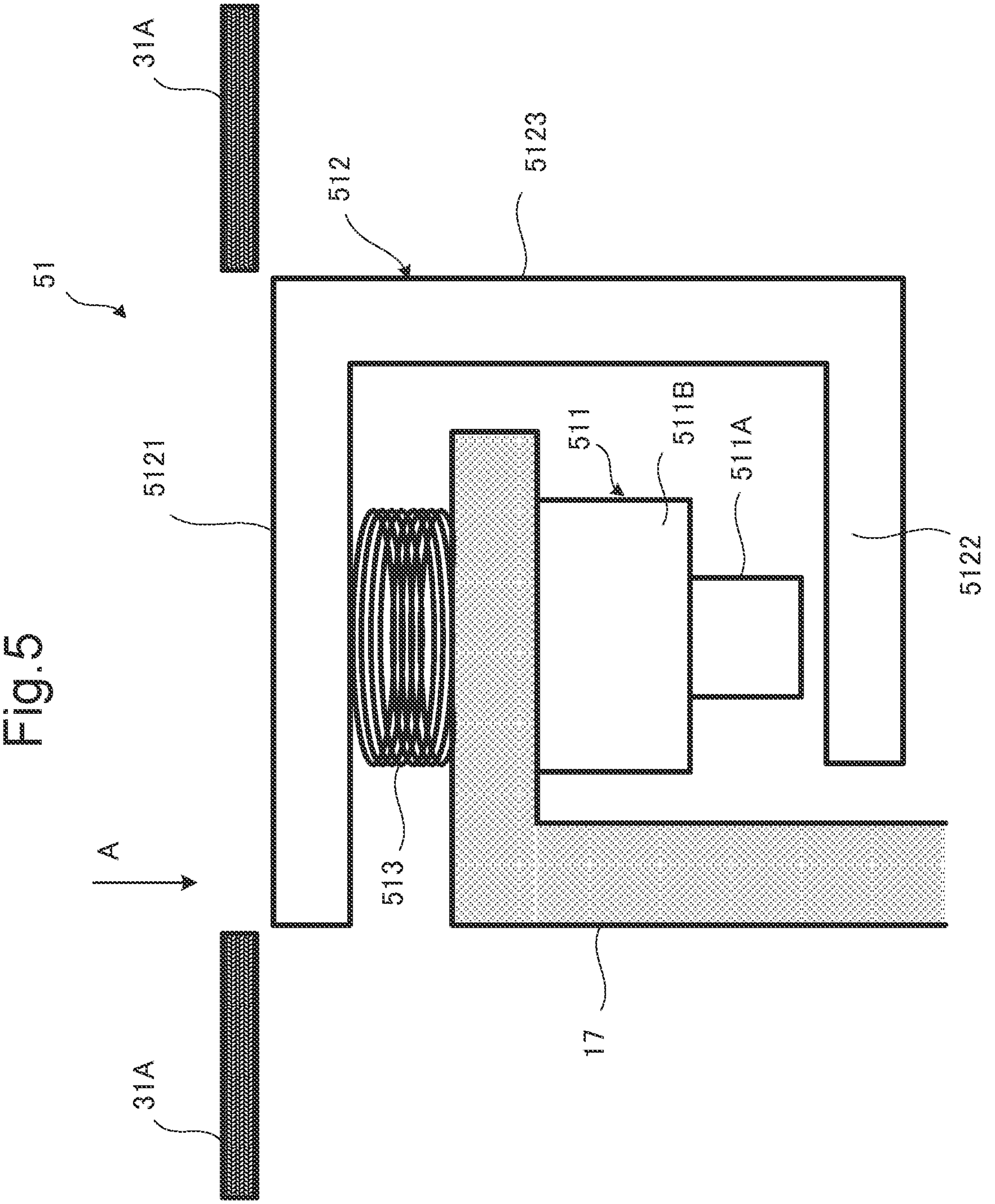

When the abutment portion 5121 is subjected to a pressure equal to or greater than the pressing force V1, applied in the direction of the arrow A in FIG. 4, the pressure spring 513 is compressed, and the abutment portion 5121 is displaced away from the transport route 31A. Accordingly, the pressing portion 5122 is also displaced in the direction of the arrow A, in other words so as to release the movable portion 511A from the pressed state. When the pressing portion 5122 thus moves in the direction of the arrow A, the pressing portion 5122 of the contact portion 512 moves to the position where the movable portion 511A of the switch main body 511 is no longer subjected to the pressure of the pressing portion 5122 as shown in FIG. 5. As result, the switch main body 511 is turned off.

Figure 6:
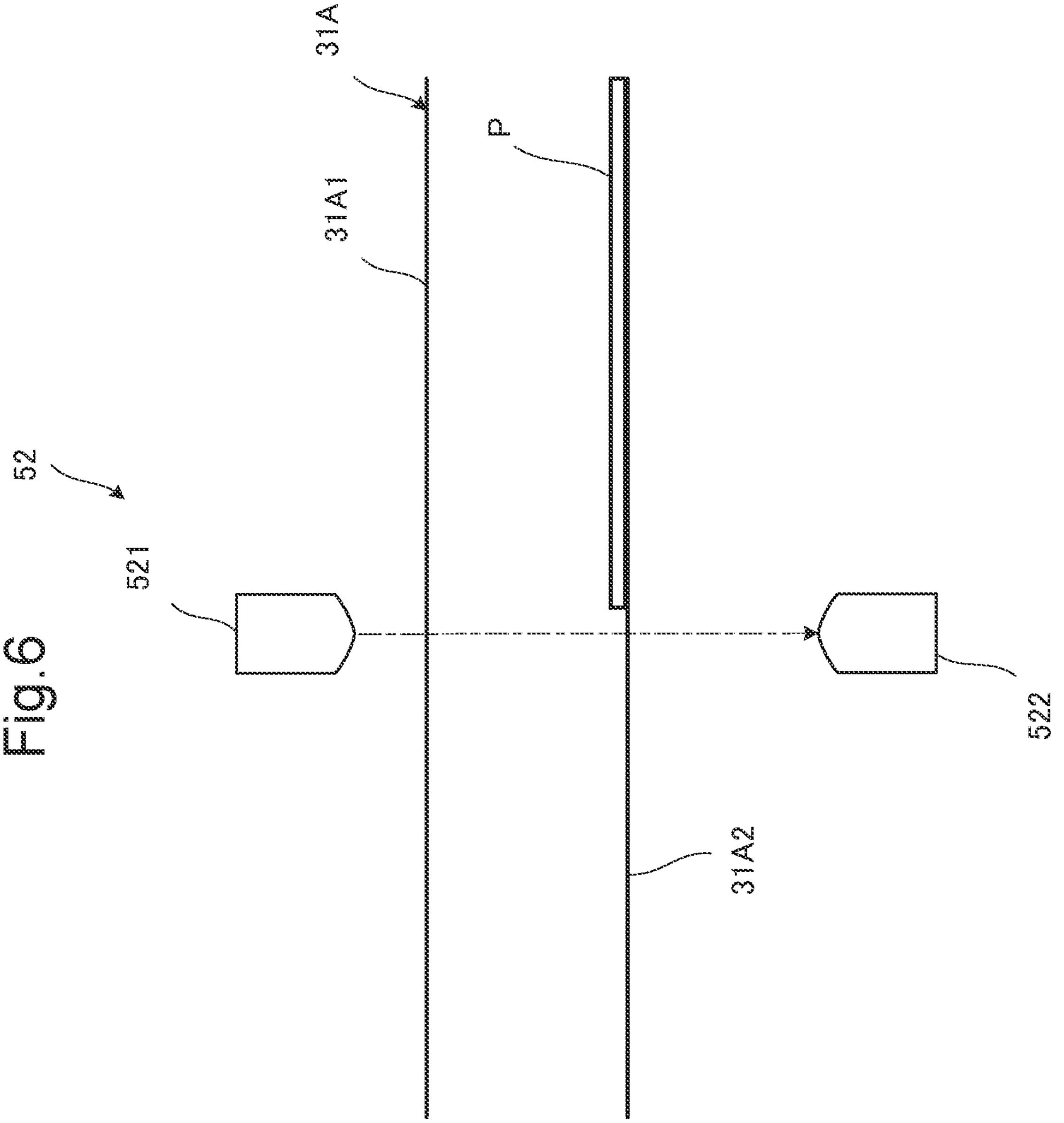
FIG. 6 is a schematic drawing showing a configuration of a timing sensor.

A configuration of the timing sensor 52 will now be described hereunder. FIG. 6 is a schematic drawing showing the configuration of the timing sensor 52. The timing sensor 52 is provided on the transport route 31A, at a position upstream of the switching device 51 in the sheet transport direction. As shown in FIG. 6, the timing sensor 52 includes a light emitting element 521 and a photodetector 522. The light emitting element 521 is located on one side face 31A1 of the transport route 31A. The light emitting element 521 emits light toward the other side face 31A2 of the transport route 31A, through a hole formed in the side face 31A1. The light emitting element 521 is, for example, a light-emitting diode (LED). The photodetector 522 is located on the side face 31A2, so as to oppose the light emitting element 521. The photodetector 522 receives the light emitted from the light emitting element 521, through a hole formed in the side face 31A2. The photodetector 522 is, for example, a photo diode. With such a configuration, the photodetector 522 receives the light from the light emitting element 521, when the sheet P is not passing the position on the transport route 31A where the timing sensor 52 is provided. In contrast, when the sheet P is passing the position on the transport route 31A where the timing sensor 52 is provided, the photodetector 522 does not receive the light. When not receiving the light, the photodetector 522 outputs a sheet presence signal, indicating that the sheet is present on the transport route 31A, to the controller 100. In other words, the time point that the signal from the photodetector 522 has changed to the sheet presence signal from a sheet absence signal, indicating that the sheet is not present on the transport route 31A, corresponds to the time point that the timing sensor 52 has detected the leading edge of the sheet P.

The second rigidity detection device 60 provided on the transport route 31B, and including a switching device 61 and a timing sensor 62, is configured similarly to the first rigidity detection device 50 including the switching device 51 and the timing sensor 52.

Figure 7:
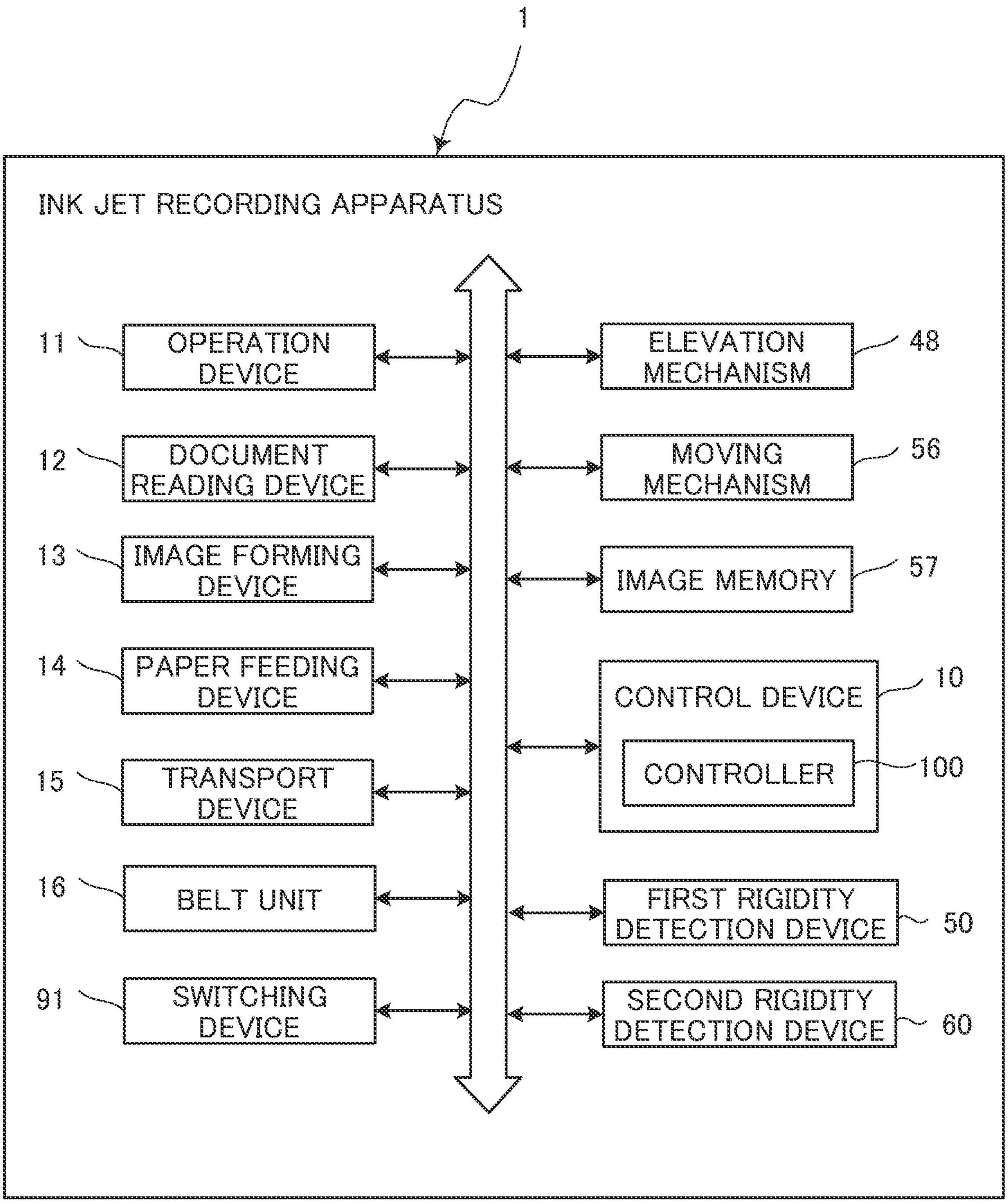
FIG. 7 is a functional block diagram showing an essential internal configuration of the ink jet recording apparatus.

FIG. 7 is a functional block diagram showing an essential internal configuration of the ink jet recording apparatus 1. The ink jet recording apparatus 1 includes the operation device 11, the document reading device 12, the image forming device 13, the paper feeding device 14, the transport device 15, the belt unit 16, the elevation mechanism 48, a moving mechanism 56 for moving the cap 18 horizontally and vertically as above, an image memory 57, the first rigidity detection device 50, the second rigidity detection device 60, the branching device 91, and a control device 10.

The control device 10 includes a processor, a random-access memory (RAM), a read-only memory (ROM), and an exclusive hardware circuit. The processor is, for example, a central processing unit (CPU), an application specific integrated circuit (ASIC), or a micro processing unit (MPU).

The control device 10 acts as the controller 100, when the processor executes various programs stored in a non-volatile memory. Here, the controller 100 may be constituted in the form of a hardware circuit, without limitation to being realized by the execution of the program.

The controller 100 serves to control the operation device 11, the document reading device 12, the image forming device 13, the paper feeding device 14, the transport device 15, the belt unit 16, the elevation mechanism 48, the moving mechanism 56, the image memory 57, the first rigidity detection device 50, the second rigidity detection device 60, and the branching device 91. Thus, the controller 100 controls the overall operation of the ink jet recording apparatus 1.

For example, the controller 100 controls the motor for driving the transport roller, and the image sensor, of the document reading device 12, thereby causing the document reading device 12 to transport the source document MS and read the image thereof, and then to store the image data representing the image of the source document MS, in the image memory 57.

The controller 100 also controls the motors for rotating the paper feeding roller, the transport roller, and the resist roller of the paper feeding device 14 and the transport device 15, or the motor for rotating the drive roller 43 of the transport belt 46, thereby causing the paper feeding device 14 or manual bypass tray 32 to deliver the sheet P, or causing the transport belt 46 to transport the sheet P.

The controller 100 controls the line heads 23 of the image forming device 13 thereby causing the line heads 23 to eject the ink, on the basis of the image data stored in the image memory 57 and representing the image of the source document MS, thus causing the image forming device 13 to form the image of the source document MS on the sheet P being transported by the transport belt 46.

Further, the controller 100 controls the motor or actuator of the elevation mechanism 48 and the moving mechanism 56, to thereby move the belt unit 16 up or downward, and move the cap 18 horizontally or vertically.

Figure 8:
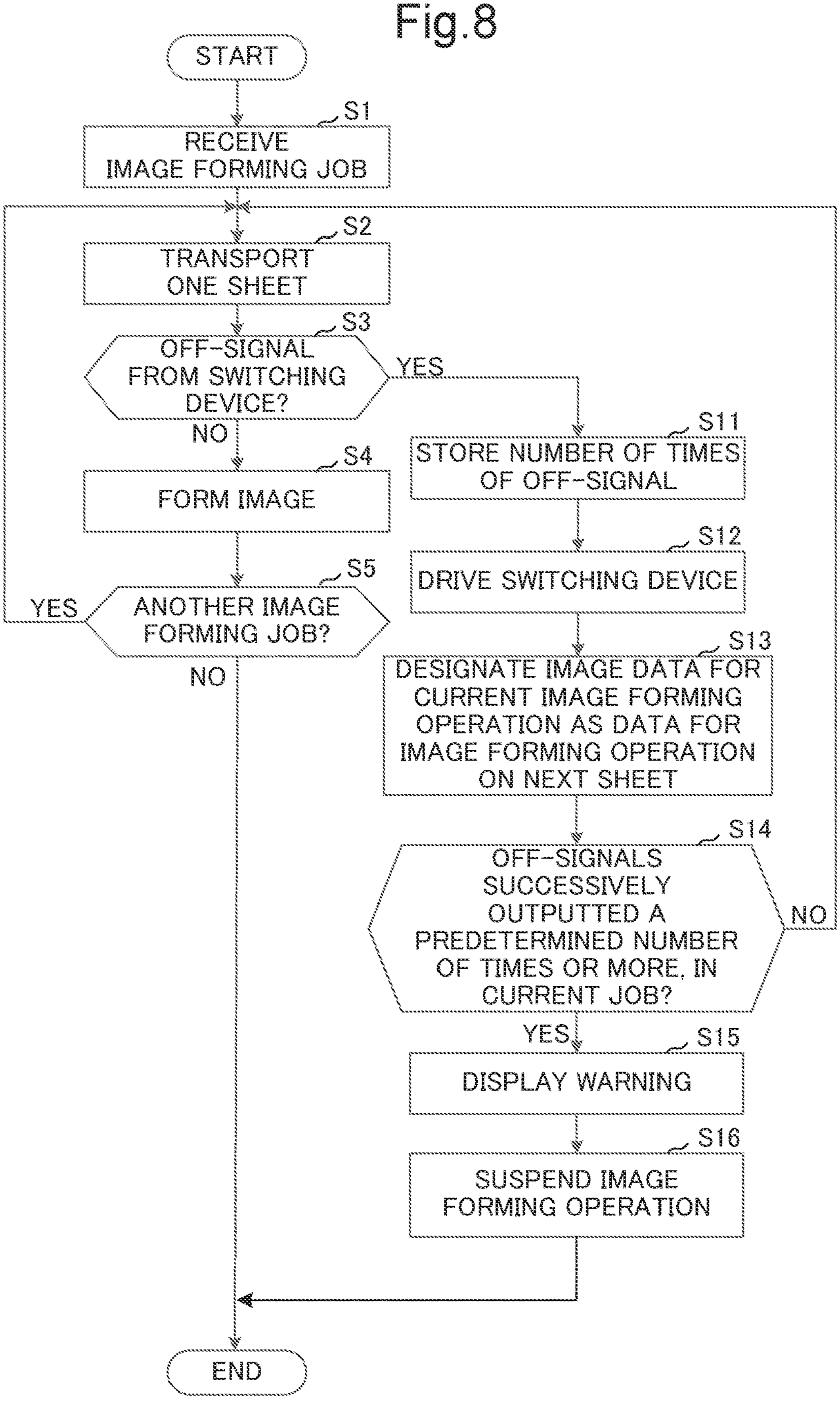
FIG. 8 is a flowchart showing a sheet transport operation.

Hereunder, a sheet transport operation, performed by the ink jet recording apparatus 1 to form the image, will be described. FIG. 8 is a flowchart showing the sheet transport operation. The following description is based on the case where the image forming job is executed to form an image on the sheet delivered from the paper feeding device 14.

Upon receipt of the image forming job (step S1), the controller 100 drives the branching device 91 so as to assume a posture PL1 indicated by solid lines in FIG. 2, and also drives the paper feeding device 14 and the transport device 15 so as to cause the paper feeding device 14 to deliver one sheet P, and cause the transport device 15 to transport the one sheet P, toward the image forming device 13 (step S2).

The controller 100 decides whether the switching device 51 is outputting the off-signal (step S3). To be more detailed, the controller 100 decides whether the signal outputted from the switching device 51 is the off-signal, when a predetermined period of time has elapsed after the receipt of the sheet presence signal from the timing sensor 52, using a built-in timer. Here, the predetermined period refers to the time between the time point that the leading edge of the sheet P having the predetermined rigidity, which disables the image forming by the ink jet recording apparatus 1 and the transport of the sheet P, has abutted against the contact portion 512 of the switching device 51, and the time point that the vibration of the sheet P and the contact portion 512, generated by the impact of the abutting action, has ceased (e.g., 0.01 seconds). Such period is determined on the basis of experimental measurement.

Upon deciding that the switching device 51 is outputting the off-signal (YES at step S3), the controller 100 counts the number of times that the switching device 51 has outputted the off-signal during the current image forming job (step S11). The controller 100 drives the branching device 91, so as to assume a posture PL2 indicated by broken lines in FIG. 2 (step S12). The controller 100 then drives the transport device 15, so as to transport the sheet P that has caused the switching device 51 to output the off-signal, from the transport route 31A along the bypass transport route 71, through the intersection IP, as far as the discharge tray 72. Accordingly, the sheet P having the rigidity unsuitable for the image forming by the ink jet recording apparatus 1, is made to circumvent the image forming device 13, instead of being delivered thereto, and delivered to the discharge tray 72.

The controller 100 designates the image data for the current image forming job, which was supposed to be printed on the sheet P that has been delivered to the discharge tray 72, as the image data to be printed on the sheet P to be transported next (step S13). The controller 100 then decides whether the number of times that the switching device 51 has outputted the off-signal in the current image forming job has reached a predetermined number of times (e.g., 20 times) (step S14).

Upon deciding that the number of times that the off-signal has been outputted has not reached the predetermined number of times (NO at step S14), the controller 100 returns to step S2.

Figure 9:
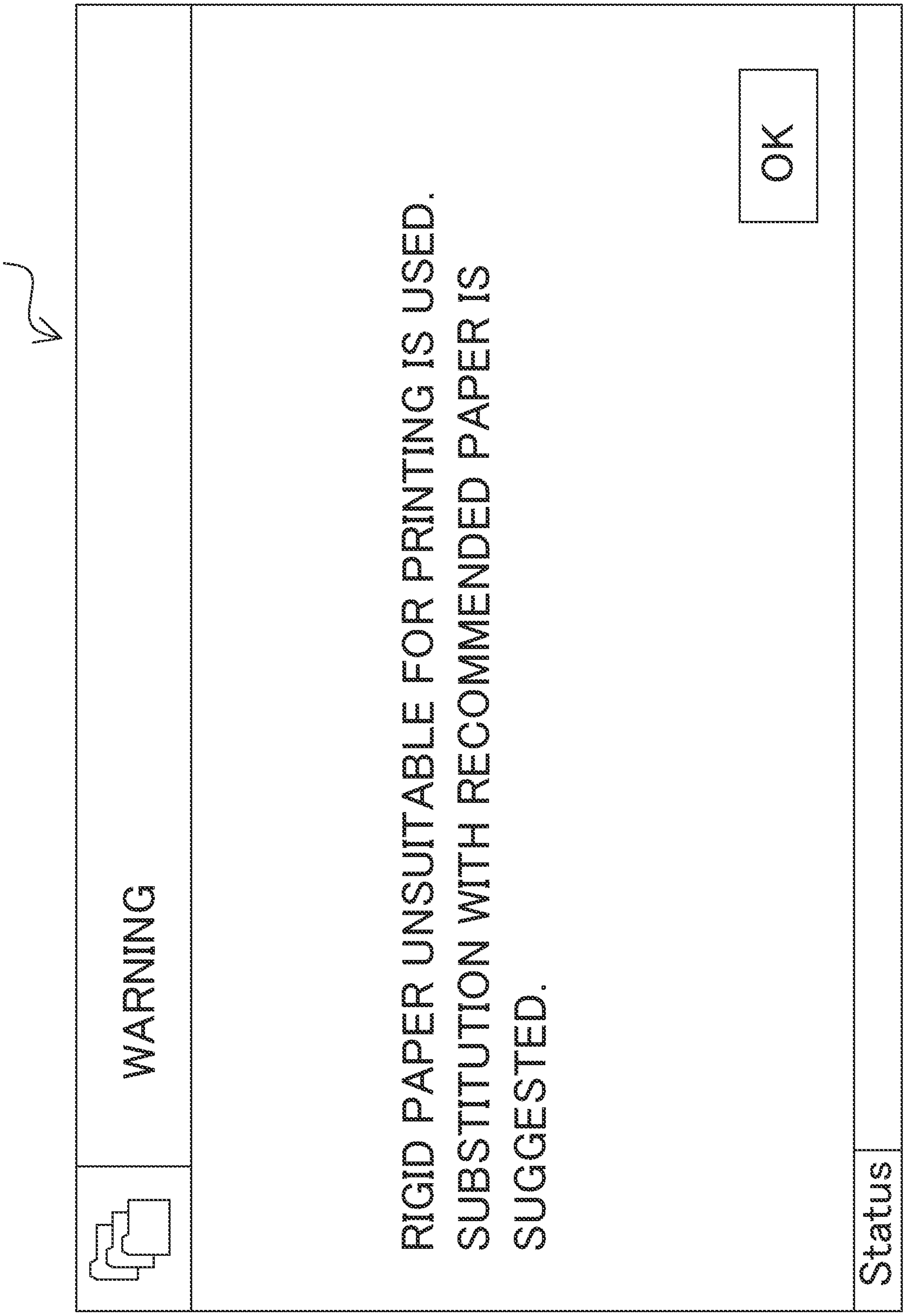
FIG. 9 is a schematic drawing showing an exemplary warning screen.

In contrast, upon deciding that the number of times that the off-signal has been outputted has reached the predetermined number of times (YES at step S14), the controller 100 causes the display device 21 to display, as shown in FIG. 9, a message warning that the unsuitable sheet P is used in the ink jet recording apparatus 1, and urging the user to use a proper sheet (step S15). After step S15, the controller 100 suspends the image forming operation based on the current image forming job (step S16). After step S16, the controller 100 finishes the sheet transport operation.

On the other hand, in the case where the controller 100 decides at step S3 that the switching device 51 is outputting the on-signal (NO at step S3), the controller 100 drives the transport device 15 so as to transport the sheet P to the image forming device 13, keeping the branching device 91 in the posture PL1 shown in FIG. 2, and causes the image forming device 13 to form the image on the sheet P, on the basis of the image data that has been supposed to be printed on the sheet P currently transported (step S4).

The controller 100 decides whether there is another image forming job to be executed on the next sheet P, on the basis of the content of the image forming job received at step S1 (step S5). Upon deciding that there is another image forming job to be executed on the next sheet P (YES at step S5), the controller 100 returns to step S2. On the contrary, upon deciding that no image forming job is scheduled for the next sheet P (NO at step S5), the controller 100 finishes the sheet transport operation.

Although the image forming job according to this embodiment is assumed to be executed on the sheet P delivered from the paper feeding device 14, the image forming job may be executed on the sheet P delivered from the manual bypass tray 32. In this case, the controller 100 performs the operation similar to the sheet transport operation shown in FIG. 8, according to the signals outputted from the switching device 61 and the timing sensor 62 of the second rigidity detection device 60. To be more detailed, when the switching device 61 is outputting the on-signal (NO at step S3), the controller 100 drives the branching device 91 so as to assume a posture PL3, indicated by dash-dot lines in FIG. 2. When the switching device 61 is outputting the off-signal (YES at step S3), and the sheet P has to be delivered to the discharge tray 72, the controller 100 drives the branching device 91 so as to assume the posture PL1 indicated by solid lines in FIG. 2. In this case, the pressing force applied to the switching device 61, by the leading edge of the sheet P having the predetermined high rigidity, is experimentally measured in advance, and such pressing force is adopted as the pressing force V1.

Further, although the leading edge of the sheet P presses the switching device 51 of the first rigidity detection device 50, or the switching device 61 of the second rigidity detection device 60, in the foregoing embodiment, the trailing edge of the sheet P may set to press the switching device 51 of the first rigidity detection device 50, or the switching device 61 of the second rigidity detection device 60. In this case also, the controller 100 performs the operation similar to the sheet transport operation shown in FIG. 8. For such purpose, the pressing force applied to the switching device 51 or 61, by the trailing edge of the sheet P having the predetermined high rigidity, is experimentally measured in advance, and such pressing force is adopted as the pressing force V1.

Now, in the case of the existing image forming apparatuses, the detection method of the rigidity of the sheet is not specified, and therefore whether the rigidity of the sheet is at a certain level is unable to be detected. To measure the rigidity of the sheet, the pressure applied by the sheet to the transport route may be measured with a pressure sensor or an acceleration sensor. Alternatively, one side of the sheet may be held so that the sheet is warped downward because of the self-weight, and such displacement may be measured with an optical sensor. However, such methods require complicated and high-accuracy sensors. Further, since it is widely known that the rigidity of the sheet varies in proportion to the basis weight or cube of the thickness, the rigidity may be predicted by detecting the basis weight or thickness. However, this is only applicable to plain papers. Special sheets employed for commercial printing include the one having high rigidity despite being thin, such as a plastic card, and therefore the rigidity may fail to be detected, depending on the type of the sheet.

According to the foregoing embodiment, in contrast, the sheet P having the rigidity unsuitable for the ink jet recording apparatus 1 can be identified, with the switching device 51 of a simply structure to be turned on or off depending on the rigidity level of the sheet P, and the sheet P having the unsuitable rigidity can be excluded from the image forming operation. In addition, since the switching device 51 is turned on or off solely on the basis of the rigidity of the sheet P, the rigidity of the sheet P being transported can be identified, irrespective of the type of the sheet P Therefore, the rigidity of the sheet P can be detected with the switching device 51 of the simple structure, irrespective of the type of the sheet P, without the need to employ the complicated and high-accuracy sensor.

The disclosure may be modified in various manners, without limitation to the foregoing embodiment. In the embodiment, the switching device 51 is turned off upon being subjected to a pressure of the leading edge of the sheet P equal to or greater than the pressing force V1, but stays on while the pressure equal to or greater than the pressing force V1 is not applied. However, the disclosure is not limited to such embodiment. For example, in a variation of the embodiment, the switching device 51 may be turned on upon being subjected to a pressure of the leading edge of the sheet P equal to or greater than the pressing force V1, but stay off while the pressure equal to or greater than the pressing force V1 is not applied.

Figure 10:
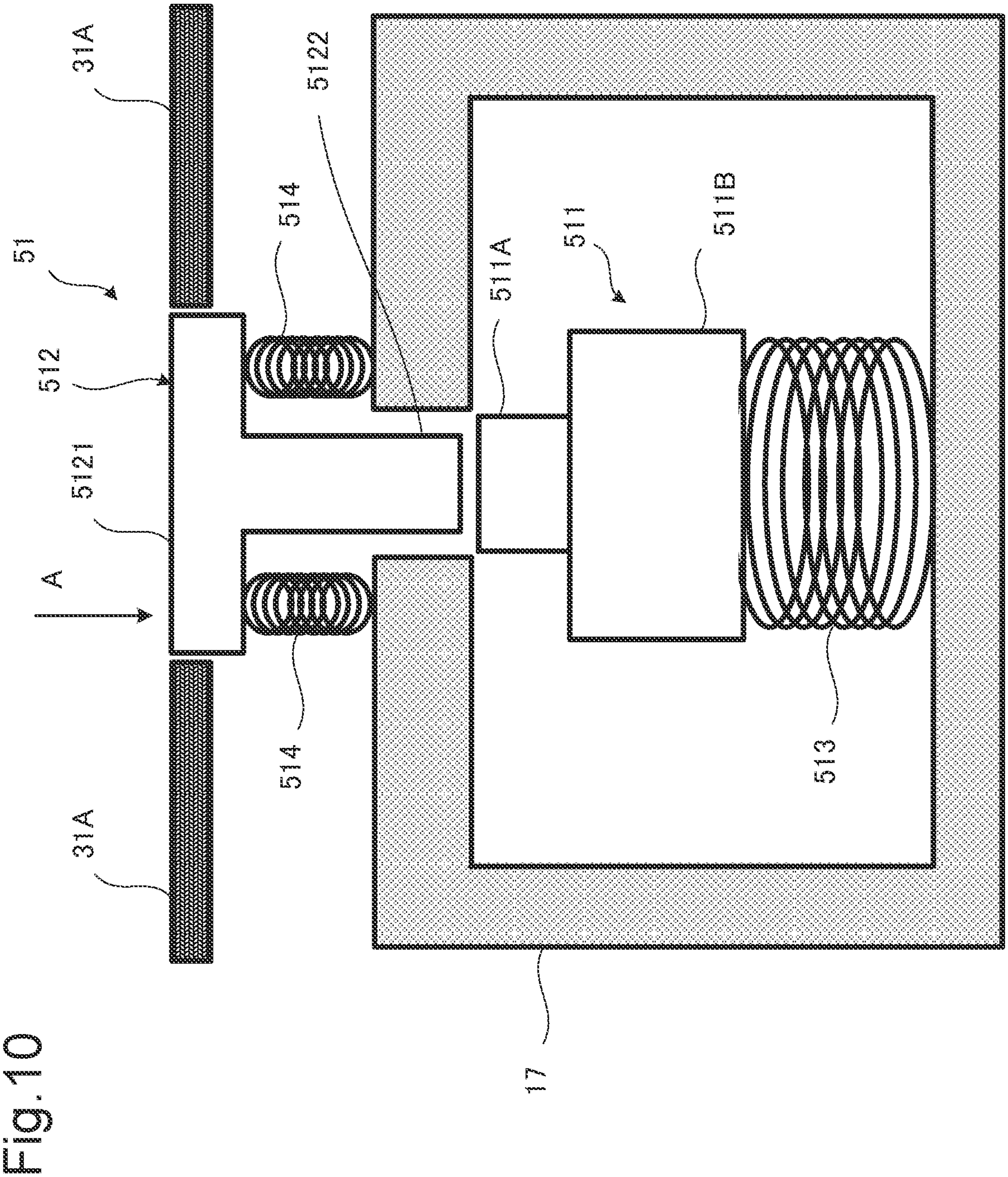
FIG. 10 and FIG. 11 are internal side views each showing another example of the structure of the switching device.

Referring now to FIG. 10, the switching device 51 according to the variation of the foregoing embodiment will be described hereunder. FIG. 10 is an internal side view showing another example of the structure of the switching device 51. The switching device 51 according to this variation includes the switch main body 511, the contact portion 512, the pressure spring 513, and a second pressure spring 514.

The switch main body 511 is mounted on the apparatus main body 17 of the ink jet recording apparatus 1, via the pressure spring 513. The switch main body 511 includes the movable portion 511A set to move for the switching action, and the pedestal 511B. The movable portion 511A is provided on the apparatus main body 17, so as to protrude toward the transport route 31A. The switch main body 511 outputs the on-signal to the controller 100, when the switching mechanism located inside the pedestal 511B is connected to be turned on, because of the movable portion 511A being pressed into the pedestal 511B by a pressure applied by the contact portion 512 from the side of the transport route 31A. While the switching mechanism is disconnected and turned off, because of the movable portion 511A being free from the pressure of the contact portion 512 and not pressed into the pedestal 511B (state shown in FIG. 10), the switch main body 511 outputs the off-signal to the controller 100.

The contact portion 512 is formed of a member separate from the switch main body 511. The contact portion 512 is mounted on a part of the apparatus main body 17, to which the switch main body 511 is fixed via the second pressure spring 514. The contact portion 512 is, as shown in FIG. 10, formed in a T-shape in a side view. The contact portion 512 includes the abutment portion 5121 exposed in the transport route 31A, and the pressing portion 5122 protruding from the abutment portion 5121 so as to contact and press the movable portion 511A of the switch main body 511.

The abutment portion 5121, constituting a part of the contact portion 512, is exposed in the transport route 31A, at a position upstream of the image forming device 13 in the sheet transport direction.

The abutment portion 5121 is constantly biased toward the transport route 31A, by the pressing force of the second pressure spring 514, having one end portion attached to the apparatus main body 17. Accordingly, the pressing portion 5122 is spaced from the movable portion 511A of the switch main body 511. Therefore, while the abutment portion 5121 is not subjected to a pressure in the direction of the arrow A in FIG. 10, the pressing portion 5122 does not press the movable portion 511A of the switch main body 511, so that the switch main body 511 is maintained in the off state.

Figure 11:
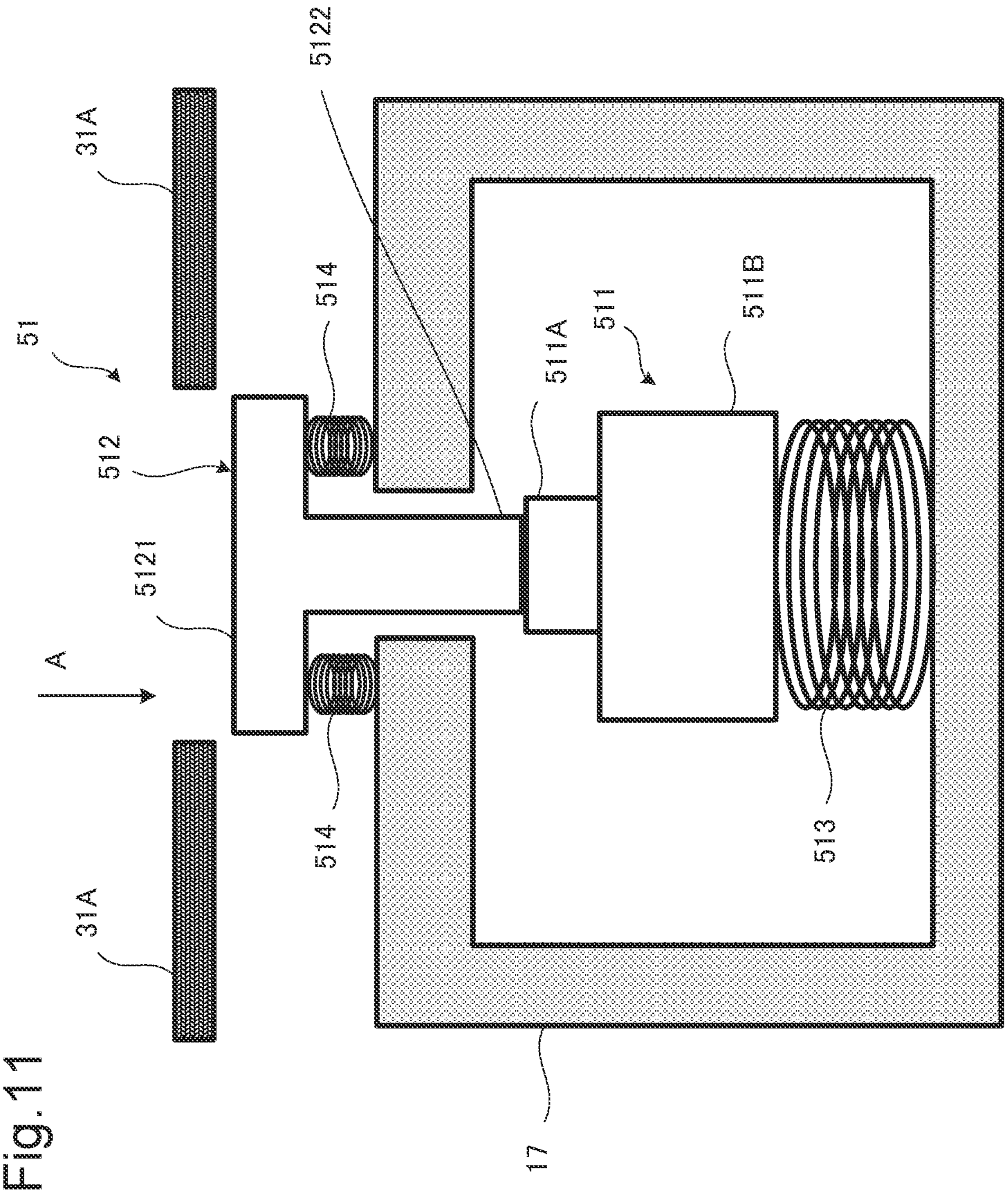

When the abutment portion 5121 is subjected to a pressure of the sheet P equal to or greater than the pressing force V1, applied in the direction of the arrow A in FIG. 10, the second pressure spring 514 is compressed, and the abutment portion 5121 is displaced away from the transport route 31A in FIG. 10. Accordingly, the pressing portion 5122 is also displaced in the direction of the arrow A, in other words so as to press the movable portion 511A. When the pressing portion 5122 thus moves in the direction of the arrow A, the pressing portion 5122 of the contact portion 512 moves to the position where the movable portion 511A is pressed thereby, as shown in FIG. 11. As result, the switch main body 511 is turned on.

In the case of adopting the switching device 51 according to this variation, the controller 100 performs, upon deciding that the switching device 51 is outputting the on-signal, the operation corresponding to the process in the sheet transport operation shown in FIG. 8 to be performed when the off-signal is outputted, and performs the operation corresponding to the process in the sheet transport operation shown in FIG. 8 to be performed when the on-signal is outputted, upon deciding that the switching device 51 is outputting the off-signal.

Although the image forming apparatus according to the disclosure is exemplified by the ink jet recording apparatus 1 in the foregoing embodiment, the image forming apparatus according to the disclosure may be of a different type, such as an image forming apparatus that employs an electrophotography process.

The configurations and processings according to the foregoing embodiments, described with reference to FIG. 1 to FIG. 11, are merely exemplary and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
- a sheet storage section for storing sheets therein;
- an image forming device that forms an image on the sheet;
- a first discharge tray;
- a first transport route provided between the sheet storage section and the image forming device, and having at least two curved portions;
- a second transport route provided between the image forming device and the first discharge tray, and having at least one curved portion;
- a transport device that picks up the sheets stored in the sheet storage section, transports the sheet to the image forming device along the first transport route, and transports the sheet, on which the image is formed, to the first discharge tray along the second transport route; and
- a switching device to output an on-signal or an off-signal, depending on a magnitude of pressing force applied by an end portion of the sheet transported along the first transport route, at a position corresponding a first curved portion on the most upstream side of a sheet transport direction in the first transport route,
- wherein the switching device being configured to output the on-signal or the off-signal, depending on whether the pressing force is equal to or larger than a predetermined pressing force to be applied by the sheet having predetermined rigidity, or smaller than the predetermined pressing force, the image forming apparatus further comprising:
- a second discharge tray;
- a bypass transport route branched from the first transport route at a position from the first curved portion to a next curved portion which located next to the first curved portion, and extending to the second discharge tray without passing the image forming device;
- a branching device located at the branch point on the first transport route, and configured to switch a transport destination of the sheet between the first transport route and the bypass transport route; and
- a control device including a processor, and configured to act, when the processor executes a control program, as a controller that causes the branching device, depending on whether the switching device outputs the on-signal or the off-signal, to set the transport destination of the sheet to the first transport route, when the pressing force is smaller than the predetermined pressing force, and to switch the transport destination of the sheet to the bypass transport route, when the pressing force is equal to or greater than the predetermined pressing force.

2. The image forming apparatus according to claim 1,
- wherein the controller causes the image forming device, upon causing the branching device to switch the transport destination of the sheet to the bypass transport route, to form the image represented by the image data supposed to be printed on the sheet guided to the bypass transport route, on the sheet to be transported next by the transport device to the image forming device.

3. The image forming apparatus according to claim 1, further comprising an alerter that outputs a warning to a user,
- wherein the controller counts a number of times that the pressing force has successively reached the predetermined pressing force, according to whether the switching device outputs the on-signal or the off-signal, and causes the alerter to output the warning to the user, when the counted number of times reaches a predetermined number of times.

4. The image forming apparatus according to claim 1,
- wherein the switching device includes:
  - a switch main body to output the on-signal or the off-signal;
  - a contact portion having one part exposed in the first transport route at a position corresponding the first curved portion, and another part set to contact the switch main body; and
  - an elastic member that keeps the switch main body in a state of outputting the on-signal, by pressing the other part of the contact portion into the switch main body, with a pressing force applied to the contact portion in a direction opposite to the pressing force of the end portion of the sheet, and turns the switch main body to a state of outputting the off-signal by being deformed so as to release the contact portion from the pressure toward the switch main body, when the one part of the contact portion is subjected to the pressing force of the end portion of the sheet.

5. The image forming apparatus according to claim 1,
- wherein the switching device includes:
  - a switch main body to output the on-signal or the off-signal;
  - a contact portion having one part exposed in the first transport route at a position corresponding the first curved portion, and another part set to contact the switch main body; and an elastic member that keeps the switch main body in a state of outputting the off-signal, by keeping the other part of the contact portion away from the switch main body, with a pressing force applied to the contact portion in a direction opposite to the pressing force of the end portion of the sheet, and turns the switch main body to a state of outputting the on-signal by pressing the other part of the contact portion into the switch main body, when the one part of the contact portion is subjected to the pressing force of the end portion of the sheet.

* * * * *